July 20, 1971    H. W. KEUCHEL    3,594,459
PROCESS FOR THE PRODUCTION OF CONJUGATE FOAM
FIBRILLATED STRUCTURES
Filed April 3, 1967    3 Sheets-Sheet 1

INVENTOR
HERBERT W. KEUCHEL

BY
ATTORNEY

July 20, 1971 H. W. KEUCHEL 3,594,459
PROCESS FOR THE PRODUCTION OF CONJUGATE FOAM
FIBRILLATED STRUCTURES
Filed April 3, 1967 3 Sheets-Sheet 2

INVENTOR
HERBERT W. KEUCHEL

BY
ATTORNEY

July 20, 1971 H. W. KEUCHEL 3,594,459
PROCESS FOR THE PRODUCTION OF CONJUGATE FOAM
FIBRILLATED STRUCTURES
Filed April 3, 1967 3 Sheets-Sheet 3

INVENTOR
HERBERT W. KEUCHEL

BY
ATTORNEY

United States Patent Office 3,594,459
Patented July 20, 1971

3,594,459
PROCESS FOR THE PRODUCTION OF CONJUGATE FOAM FIBRILLATED STRUCTURES
Herbert W. Keuchel, Charlotte, N.C., assignor to Celanese Corporation, New York, N.Y.
Filed Apr. 3, 1967, Ser. No. 628,030
Int. Cl. B29d; B29f 3/10
U.S. Cl. 264—47                                    5 Claims

ABSTRACT OF THE DISCLOSURE

Processes for the preparation of conjugate fibrillated extrudates and the products produced thereby, the process involving extruding a conjugate extrudate, at least one component of said extrudate containing a foaming agent and then attenuating the foamed extrudate. Attenuation of the extrudate encompasses processes wherein said extrudate is maintained at temperatures sufficiently high to inhibit orientation and produce fibrillation while the polymer is in unoriented configuration and processes wherein the extrudate is cooled to a temperature sufficiently low to induce orientation, oriented and fibrillated.

---

This invention relates to fibrillated structures, and more specifically to conjugate or multi-component foam fibrillated textile products.

The fibrillation of extruded polymeric materials has recently attracted the attention of the textile industry because in comparison with polymers extruded by spinnerette methods to form filament yarn, tow, staple and monofilament, the extrusion of extrudates which can be subsequently subjected to fibrillation techniques result in high production rates and lower cost of equipment. Polyolefins and especially polypropylene resins have been found to be especially satisfactory for fibrillation techniques. Polypropylene resin is commonly converted into unoriented film by a melt type casting operation; thereafter a typical process involves slitting into narrow bands orienting uniaxially in a hot-stretching zone and thereby crystallizing, using a stretching zone temperature of about 170° C. and draw ratios of about 12 and thereafter mechanically working to form a fibrillated product. Fibrillated products produced by such techniques have found wide acceptance in the carpet industry, and particularly in outdoor carpet applications. The products, however, are lacking in some of the more specialized features which may be found in true textile fibers, that is to say, fibers which are produced by the extrusion of polymers through a filament forming spinnerette, such as for instance, spinnerette formed conjugate fibers. More specifically, products produced by fibrillation techniques are generally lacking in the high degree of crimp and self bulking tendencies, the fine texture, improved dyeability and reduced static electricity which is characteristic of conventionally prepared textile products. It has been further noted that polyolefins such as polypropylene which is commonly produced in the form of fibrillated products, often have an objectionable clammy feel due in part to the hydrophobicity of the polymer.

It is therefore an object of this invention to produce fibrillated articles having physical properties more nearly approaching those of naturally occurring conventional textile products.

It is another object of this invention to prepare conjugate fibrillated textile products.

It is still another object of this invention to provide a process for the preparation of conjugate fibrillated textile products.

These and other objects of the invention will become more apparent from the following description of the invention.

In accordance with this invention, it has now been discovered that fibrillated products of enhanced textile characteristics may be obtained by means of a process which consists of producing a conjugate extrudate and subjecting the conjugate extrudate to fibrillation operations. Preferably the conjugate is a foamed conjugate extrudate, the foaming agent being either a gas or a compound which evolves gas at extrusion temperature. The foamed extrudate is still more preferably subjected to a drawing operation while said extrudate is maintained at temperatures sufficiently high to inhibit orientation of at least one component of the conjugate system. It should be understood however, that the conjugate extrudate may be extruded directly into a quenching bath to bring this temperature sufficiently low to induce orientation and then subjected to a drawing operation in order to orient the polymeric material. Preferably the oriented extrudate is then subjected to a limited amount of mechanical action in order to increase fibrillation.

A better understanding of the invention may be had from a discussion of the drawings wherein.

Figure 1:
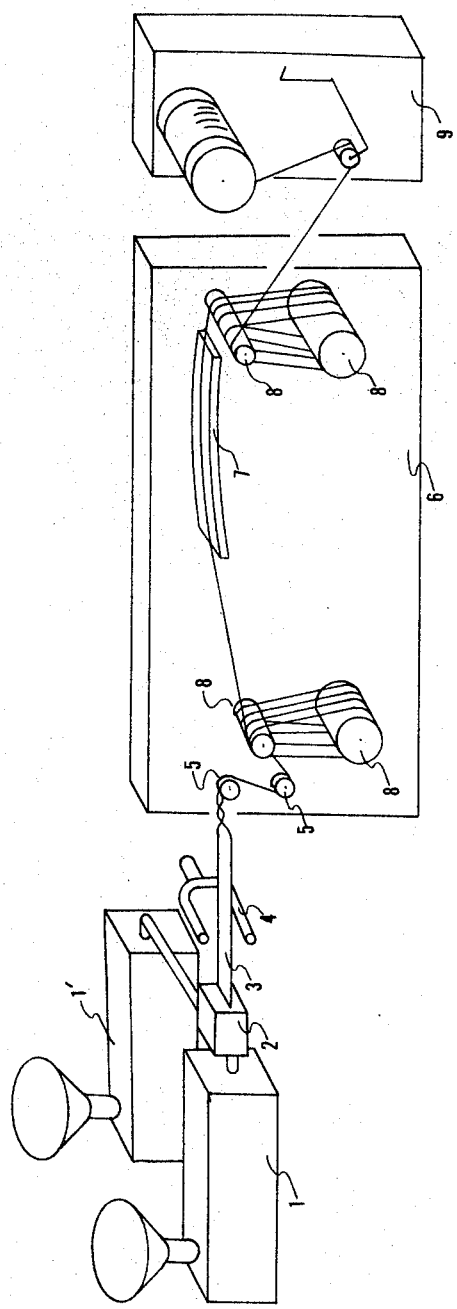
FIG. 1 is an illustration of one form of the conjugate extrudate fibrillation process of this invention.

Turning to FIG. 1, molten blends of polymer and foaming agent contained in extruders 1 and 1' are passed through a die 2 so as to form a satisfactory conjugate extrudate 3. The temperature of extrudate 3 is maintained at a satisfactory temperature range which is sufficiently high to inhibit orientation of at least one of the polymeric components making up extrudate 3, by means of fork member 4. Fork member 4 subjects extruders 3 to a flow of liquid or gas such as air maintained within the desired temperature range, that is to say, the flow of air may be either a heating or cooling flow of air. The attenuation of the hot melt extrudate 3 and the resultant fibrillation takes place immediately after the extrudate leaves die member 2. It should be understood that after hot melt attenuation, a satisfactory fibrillated end product is produced. It is sometimes preferred, however, that the fibrillated product undergo additional mechanical working and may be passed through a false twisting zone such as skewed roll members 5. Subsequent to mechanical treatment, the product is preferably oriented to obtain additional strength by passage through a draw frame 6, draw frame 6 comprising two pairs of draw rolls 8 and a heated shoe member 7 disposed therebetween. The fibrillated and oriented product may then be taken up upon a suitable take up device 9.

Figure 2:
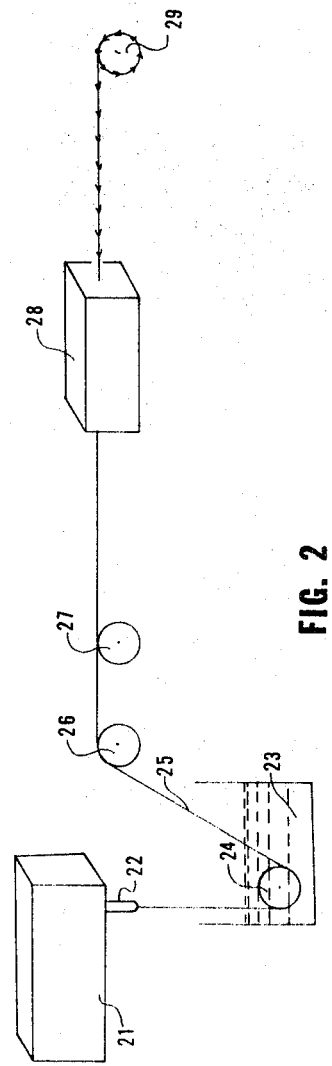
FIG. 2 is a schematic illustration of another form of a conjugate extrudate fibrillation process of this invention.

Alternatively, the molten blend of polymers and foaming agents may be extruded as shown in FIG. 2, the polymeric materials being passed through extrudate 21 and die member 22 so as to form a conjugate extrudate into a quenching bath 23. An immersion roll 24 is used to maintain extrudate 25 beneath the surface of the cooling liquid. Extrudate 25 which has been cooled to a temperature sufficiently low to induce orientation of the polymer is then passed over godet wheels 26 and 27 in order to draw and thereby orient extrudate 25 by any of the well-known conventional means. The oriented extrudate 25 is then passed through a suitable mechanical working member 28 which may be a device, such as for instance, a false twist spindle, a knife edge or a series of pin guides which lead the extrudate 28 through a tortuous path. Upon emerging from mechanical working member 28 the extrudate 25 is in fibrillated form and may be taken up upon a suitable take up package 29.

It should be understood that any one of a wide variety of combinations of polymeric materials may be employed in preparing the product of this invention. The following combinations of at least two polymeric components have been found to be especially satisfactory: (1) polymers of the same type, but different in molecular weight; (2) polymers of the same type, but containing different additives; (3) polymers of different types; (4) polymeric combinations wherein one polymer is not foamed prior to extrusion; (5) polymeric combinations wherein one of the components has experienced a different thermal and/or shear history. Polymers suitable for producing the aforementioned combinations may be polymers such as for instance, polyethylene, polypropylene, polybutene, polymethyl-3-butene, polystyrene, polyamides such as polyhexamethylene adipamide and polycaprolactam, acrylic resins such as polymethylmethacrylate and methyl methacrylate, polyethers such as polyoxymethylene, halogenated polymers such as polyvinyl chloride, polyvinylidene chloride, tetrafluoroethylene, hexafluoropropylene, polyurethanes, cellulose ethers of acetic acid, propionic acid, butyric acid and the like, polycarbonate resins and polyacetal resins. Resins which have been found to be especially suitable for use in conjunction with the present invention are polyethylene, polypropylene, polystyrene, polymethyl-3-butene, cellulose esters and nylon.

Where it is desired to produce a fibrillated product having reduced hydrophobic characteristics, such as for instance, a polypropylene fibrillated product having reduced hydrophobic characteristics, it is preferred that the second component of the polypropylene conjugate system be a component having hydrophilic groups. Polymeric materials which enhance the hydrophylic character of polypropylene are polymers such as esters of polyacids such as polyacrylates or polymethacrylates or esters or acetals of polyalcohols such as polyvinyl esters, polyallyl esters and polyvinyl acetal as well as polyoxyethyene and polyvinyl alcohol.

The foaming agents which are employed in the process of the invention are any of the well-known polymeric foaming agents. As previously indicated, solids or liquids which vaporize or decompose into gaseous products at the extrusion temperatures, as well as volatile liquids may be employed. Solids which are suitably employed in the process of the present invention include azoisobutiric dinitrile; diazoamino benzene; 1,3 bis (p-xenyl) triazine azodicarbonamide and similar azo compounds which decompose at temperatures below the extrusion temperature of the forming composition. Commonly used solid foaming agents producing either nitrogen or carbon dioxide include sodium bicarbonate and oleic acid, ammonium carbonate and mixtures of ammonium carbonate, sodium nitrite and oxalic acid. Volatile liquids which are suitable foaming agents include water, as well as salts which will release their water of hydration at extrusion temperatures, acetone, methyl ethyl ketone, ethyl acetate, methyl chloride, ethyl chloride, chloroform, methylene chloride, methylene bromide and, in general, fluorine containing normally liquid volatile hydrocarbons. Foaming agents which are the normally gaseous compounds such as nitrogen, carbon dioxide, ammonia, methane, ethane, propane, ethylene, propylene and gaseous halogenated hydrocarbons are also desirable. A particularly preferred class of foaming agents are fluorinated hydrocarbon compounds having from 1 to 4 carbon atoms, which, in addition to hydrogen and fluorine, may also contain chlorine and bromine. Examples of such blowing agents are dichlorodifluoromethane,
dichlorofluoromethane,
chlorofluoromethane,
difluoromethane,
chloropentafluoroethane,
1,2-dichlorotetrafluoroethane,
1,1-dichlorotetrafluoroethane,
1,1,2-trichlorotrifluoroethane,
1,1,1-trichlorotrifluoroethane,
2-chloro-1,1,1-trifluoroethane,
2-chloro-1,1,1,2-tetrafluoroethane,
1-chloro-1,1,2,2-tetrafluoroethane,
1,2-dichloro-1,1,2-trifluoroethane,
1-chloro-1,2-trifluoroethane,
1-chloro-1,1-difluoroethane,
perfluorocyclobutane,
perfluoropropane,
1,1,1-trifluoropropane,
1-fluoropropane,
2-fluoropropane,
1,1,1,2,2-pentafluoropropane,
1,1,1,3,3-pentafluoropropane,
1,1,1,2,3,3-hexafluoropropane,
1,1,1-trifluoro-3-chloropropane,
trifluoromethylethylene,
perfluoropropene and
perfluorocyclobutene.

A better understanding of the means by which a conjugate extrudate is formed may be seen by a discussion of FIGS. 3-19 of the drawings.

Figure 3:
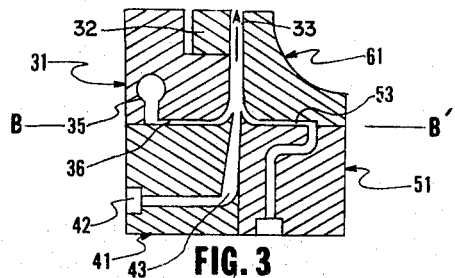
FIG. 3 is a simplified cross-sectional view of a four quadrant trilateral extrusion die.
Figure 5:
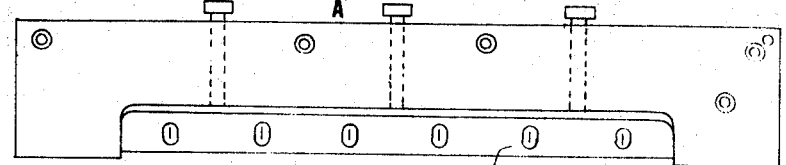
FIG. 5 is a top view of the quadrant represented by FIG. 4.
Figure 4:
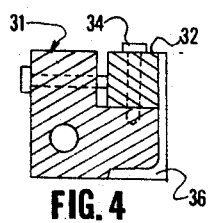
FIG. 4 is a detailed cross-sectional view of the upper left-hand quadrant formed by the line A,A and the line B,B of FIG. 3.
Figure 6:
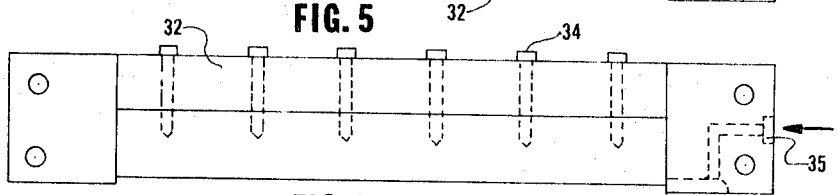
FIG. 6 is a side view of the quadrant represented by FIG. 4.
Figure 7:
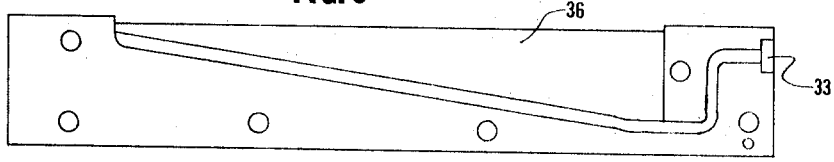
FIG. 7 is a bottom view of the quadrant represented by FIG. 4.
Figure 9:
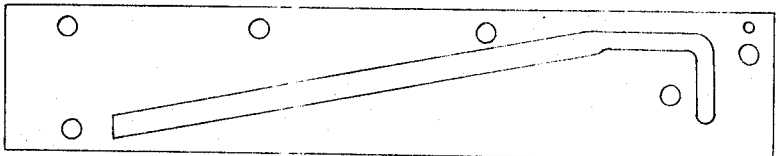
FIG. 9 is a top view of the quadrant represented by FIG. 8.
Figure 8:
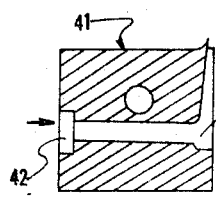
FIG. 8 is a detailed cross-sectional view of the lower left-hand quadrant formed by the line A,A and the line B,B of FIG. 3.
Figure 10:
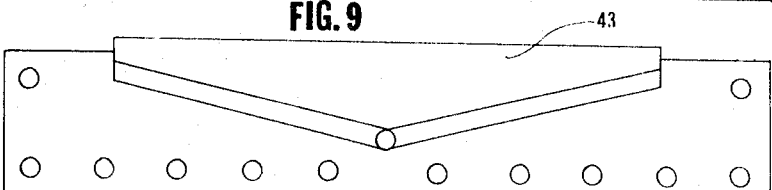
FIG. 10 is a side view of the quadrant represented by FIG. 8.
Figure 11:
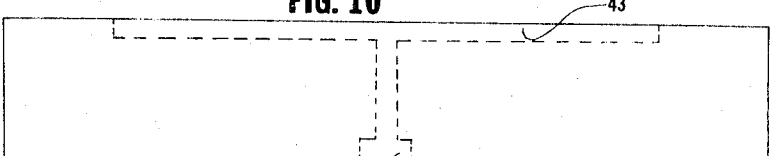
FIG. 11 is a bottom view of the quadrant represented by FIG. 8.

FIG. 3 is a simplified cross-sectional view of a trilateral extrusion die, suitable for the use in the preparation of the conjugate products of this invention. The trilateral extrusion die is composed of four sections or quadrant members which are secured together by bolt members which have not been shown in the drawings for ease of illustration. It should be understood however, that extrusion dies capable of forming bilateral extrudates or capable of forming substantially more than the illustrated trilateral extrudates, may also be employed. For ease of illustration, FIG. 3 has been divided into four quadrants, the upper left-hand quadrant formed by the lines A,A' and B,B' of FIG. 3. Section member 31 of the upper left-hand quadrant carries extrusion slot adjusting member 32 which, as may be seen in FIGS. 4, 5 and 6, is secured to quadrant member 31 by means of screw members 34. Polymer may then be fed through port 35 which will exit along channel 36 into the common extrusion slot 33.

Figure 12:
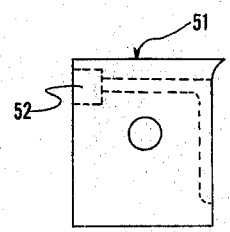
FIG. 12 is a detailed cross-sectional view of the lower right-hand quadrant formed by the line A,A' and B,B' of FIG. 3.
Figure 13:
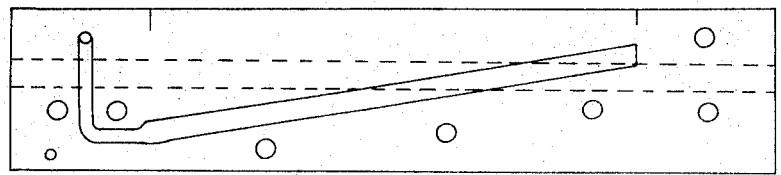
FIG. 13 is a top view of the quadrant represented by FIG. 12.
Figure 14:
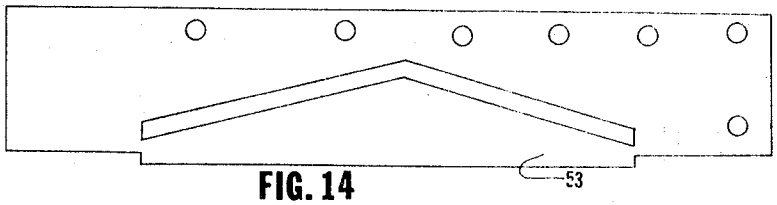
FIG. 14 is a side view of the quadrant represented by FIG.12.
Figure 15:
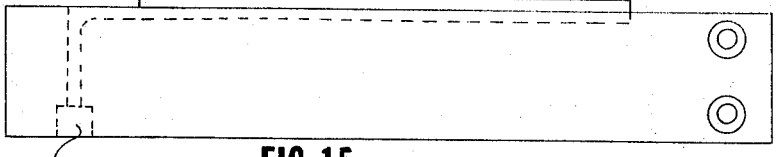
FIG. 15 is a bottom view of the quadrant represented by FIG. 12.
Figure 16:
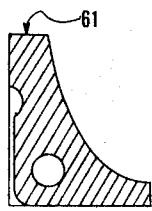
FIG. 16 is a detailed cross-sectional view of the upper right-hand quadrant formed by the line A,A' and B,B' of FIG. 3.
Figure 17:
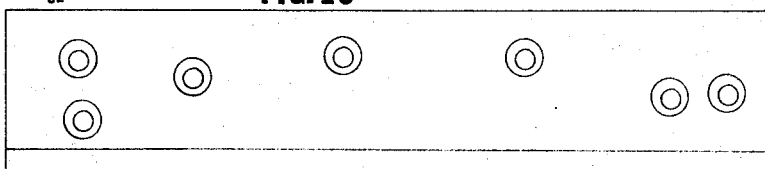
FIG. 17 is a top view of the quadrant represented by FIG.16.
Figure 18:
FIG. 18 is a bottom view of the quadrant represented by FIG. 16.
Figure 19:
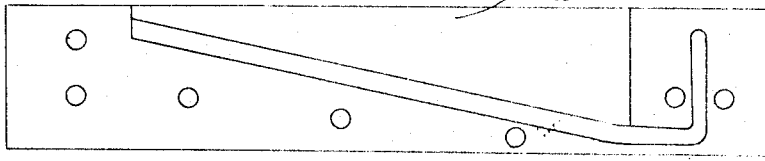
FIG. 19 is a side view of the quadrant represented by FIG. 16.

As can be seen from FIG. 3, quadrant member 31 is secured to quadrant member 41. Quadrant member 41, for ease of illustration, is shown as being the lower left-hand quadrant formed by the lines A,A' and B,B' in FIG. 3. A more detailed showing of quadrant member 41 may be seen in FIGS. 8–11 of the drawings. In FIGS. 8–11, it may be seen that quadrant member 41 employs polymer feed port 42 through which polymer may be forced through a tributary extrusion channel 43 which connects to the main extrusion slot 33. Extrusion slot 43 may be seen in a bottom view in FIG. 11 of the drawings, and in a side view in FIG. 10 of the drawings. Quadrant member 41 has its tributary extrusion slot 43 partially formed by being disposed adjacent quadrant assembly 51. Quadrant assembly 51 which is shown in greater detail in FIG. 12 of the drawings is illustrated as the lower right-hand quadrant of FIG. 3, the quadrant being formed by intersections of the lines A,A' and B,B'. As can be seen in FIG. 12 quadrant member 51 is equipped with polymer feed port 52, polymer being fed through the port 52 through to tributary channel 53. Tributary channel 53 may be seen in a top view of FIG. 13 of the drawings and in a side view of FIG. 14 of the drawings. Tributary extrusion slot 53 is formed in part by quadrant member 51 being disposed adjacent quadrant member 61. Quadrant member 61 is represented in FIG. 3 in the drawings as the upper right-hand quadrant formed by the intersection of lines A,A' and B,B'. Quadrant member 61 may be seen in greater detail in FIG. 17 of the drawings. As can be seen in FIG. 17, quadrant member 61 is without a feed port, but merely serves to form tributary extrusion slot 53 and principal extrusion slot 33. It should be understood that polymer feed may be employed in quadrant members 31, 41 and 51 or, alternatively, any two of the three quadrant members may be utilized as polymer feed members while one of the three members is retained in an idle capacity.

The following specific examples of the preparation of conjugate fibrillated products are given for purposes of illustration and should not be considered as limiting the spirit or scope of this invention.

EXAMPLE I

Two resin mixtures, each composed of a polymer and a blowing agent, are prepared by dry blending in a tumbler. Each resin mixture contains polypropylene of different molecular weight and melt viscosity.

Each resin mixture is charged into separate screw type extruders manufactured by Modern Plastics Machinery Corporation, which are joined through a common die assembly. During extrusion, each resin mixture is melted, foamed and metered through separate entrance ports into a conjugate, horizontal die assembly. The two polymer streams are kept separated until they leave the die, at which point, they merge into a layered laminate structure. The combined, foamed extrudate is then attenuated through a quench region at temperatures sufficiently high to inhibit orientation of polypropylene into a fibrillated network structure.

The extrusion conditions are individually controlled for each extruder, the extrusion conditions being as given in the following table:

|  | Extruder | |
|---|---|---|
|  | No. 1 | No. 2 |
| Polymer | Profax 6523F [1] | Profax 6823.[1] |
| Blowing agent (azodicarbonamide) percent | 1 | 1. |
| L/D (length to diameter screw ratio) | 24/1 (1″) | 20/1 (1″). |
| Revolutions per minute of extruder screw | 10 | 15. |
| Temp., ° C.: |  |  |
| Cyl. 1 of extruder | 210 | 220. |
| Cyl. 2 of extruder | 225 | 255. |
| Cyl. 3 of extruder | 250 | 300. |
| Valve of extruder | 240 | 300. |
| Die | 290 | 290–300. |
| Pressure, p.s.i.g.: |  |  |
| Screw Exit | 490 | 300. |
| Valve | 400 |  |
| Take-up, m./min. |  | 28 |
| Quench: |  |  |
| Apparatus |  | Quench fork |
| Media |  | Air |
| Rate, cu. ft./min. |  | 35 |
| Die, type |  | Trilateral film extrusion [2] |
| Slot opening, inches |  | 6 x 0.020 |

[1] Polypropylene manufactured by Hercules Company.
[2] Used for bilateral extrusion by closing one channel.

The resultant product in yarn form is found to have substantially more bulk than when subjected to heat treatment than a non-conjugate yarn prepared under similar conditions from Hercules 6523F Profax alone.

EXAMPLE II

The process of Example I is repeated with the exception that foaming agent is omitted from the Profax 6523F (polypropylene resin marketed by Hercules Company). The hotter blown material thereby contacts the cooler unblown material and by contact produces fibrillation in both faces of the conjugate extrudate. The end product is found to be similar to that produced in Example I, but not so finely fibrillated.

EXAMPLE III

The process of Example I is repeated with the exception that one of the resin mixtures employs Celcon (polyacetal resin marketed by Celanese Corporation) while the other resin mixture employs polypropylene. Extrusion conditions are individually controlled, the extrusion conditions being as given in the following table:

|  | Extruder | |
|---|---|---|
| Extrusion and Fibrillation Data | No. 1 | No. 2 |
| Polymer | Profax 6523F.[1] | Celcon (M-20)[2]. |
| Blowing agent (azodicarbonamide) percent | 1 | 1. |
| Extruder |  | (See Example I) |
| L/D (length to diameter screw ratio) | 24/1 (1″) | 20/1 (1″). |
| Temp., ° C.: |  |  |
| Cyl. 1 | 200 | 160. |
| Cyl. 2 | 220 | 180. |
| Cyl. 3 | 250 | 200. |
| Valve | 300 |  |
| Die | 275 | 275. |
| Die type, slot dimensions |  | As in Example I |
| Take-up, m./min. | 20 | 20. |
| Pressure, p.s.i.g.: |  |  |
| Screw end | 500 |  |
| Valve | 500 |  |

[1] Polypropylene resin marketed by Hercules Company.
[2] Polyacetal resin marketed by Celanese Corporation.
NOTE.—Quench: Apparatus, Media, Rate—as in Example I.

The final product in yarn form is found to have improved bulk and improved hand as compared with a non-conjugate yarn prepared by a similar process employing as a sole polymer Profax 6523F (polypropylene resin marketed by Hercules Company).

EXAMPLE IV

The process of Example I is repeated with the exception that one of the resin mixtures employs secondary cellulose acetate while the other resin mixture employs polypropylene. Extrusion conditions are individually controlled, the extrusion conditions being as given in the following table:

| Extrusion and Fibrillation Data | Extruder No. 1 | Extruder No. 2 |
|---|---|---|
| Polymer | Profax 6523F.[1] | Secondary cellulose acetate. |
| Blowing agent (Celogen AZ) percent | 1 | 1. |
| Extruder, quench systems and die arrangement. | As in Example I | |
| L/D (length to diameter screw ratio) | 24/1 | 20/1. |
| Temp., °C.: | | |
| Cyl. 1 | 200 | 200. |
| Cyl. 2 | 215 | 205. |
| Cyl. 3 | 300 | 235. |
| Valve | 200 | [2]245. |
| Temp., °C., die | 250 | 250. |
| Pressure, p.s.i.g. | 600 | 600. |
| Take-up, m./min. | 10 | 10. |

[1] Polypropylene resin marketed by Hercules Company.
[2] Melt temperature.

The end product is yarn form is found to have vastly improved dyeability and significantly improved hand and bulk when compared with a non-conjugate yarn prepared under similar conditions from Profax 6523F alone.

While the exact reason for the production of fibrils in the hot melt attenuated thermoplastic resin conjugate system of this invention is not known, it is known that the foam systems have a finite structure. In the ideal case of equal sized bubbles, a close packing in pentagonal dodecahedrons is obtained. Packed in this arrangement, the intersection of these bubbles form three angles of 120°. In the dynamic holt melt attenuation process of this invention, the cell structure is never in equilibrium; shear forces, pressure, and velocity gradients affect cell size and shape. In the earlier phases of extrusion the polymer-foam is forced under increasing pressure into a converging film die. Under compression, the cells become smaller, thus storing part of the energy supplied by the extruder. On leaving the film die, the pressure reacting on the system diminishes and part of the stored energy is released in the form of cell expansion. During expansion, the cells assume an elliptical shape oriented along with stream axis of the polymer film. Once the melt leaves the die, polymer shrinkage due to cooling and drawdown tension produce fibrillation and further attenuation.

The individual fibrills produced by the hot-melt attenuation process have a minimal number of bubbles or voids, that is to say, there is no substantial change in density of the individual fibril as compared to the density of the starting polymeric materials. The fibrils are also characterized by possessing a plurality of geometrically different cross-sections within the same fibril. While the cross-sections are described as irregular in shape, it should be noted that there is almost total absence of any flat or planar surfaces. This characteristic renders a cross-section of the fibrillated product produced by hot-melt attenuation distinctly different from products which are fibrillated by orienting a polymeric material and then relying upon the orientation to enhance fibrillation in that polymeric products which undergo orientation prior to fibrillation are characterized by having trapezoidal cross-sections.

Having thus disclosed the invention, what is claimed is:

1. A process for the production of a fibrillated conjugate polymeric product, said process comprising continuously extruding all polymeric components of said conjugate extrudate, said polymeric components being polymers selected from the group consisting of polyolefins, polystyrene, polyamides, acrylic resins, polyethers, halogenated polymers, cellulose ethers, polycarbonate resins and polyacetal resins, at least one component of said conjugate extrudate containing a foaming agent and then hot melt attenuating the foamed extrudate to at least partially fibrillate in the initial drawing operation.

2. The process of claim 1 wherein subsequent to extrusion the extrudate is maintained at a temperature sufficiently high to inhibit orientation of at least one of the polymers.

3. The process of claim 1 wherein at least one of the components of said conjugate extrudate is polyolefin, 4. The process of claim 1 wherein the extrudate is subjected to a second drawing operation.

5. The process of claim 4 wherein subsequent to said second drawing operation, the extrudate is subjected to mechanical working.

References Cited
UNITED STATES PATENTS

| | | | |
|---|---|---|---|
| 2,531,234 | 11/1950 | Seckel | 264—Mixed version |
| 2,861,319 | 11/1958 | Breen | 264—Bicomp. |
| 2,932,079 | 4/1960 | Dietzsch et al. | 264—Bicomp. |
| 3,112,160 | 11/1963 | Rush | 264—Bicomp. |
| 3,173,163 | 3/1965 | Crampton | 264—Bicomp. |
| 3,209,402 | 10/1965 | Riley et al. | 264—Bicomp. |
| 3,214,234 | 10/1965 | Bottomley | 264—290 |
| 3,264,390 | 8/1966 | Tanner | 264—Bicomp. |
| 3,315,455 | 4/1967 | Stoller | 264—103 |
| 3,323,978 | 6/1967 | Rasmussen | 264—Mixed version |
| 3,335,560 | 8/1967 | Ichikawa | 264—103 |
| 3,353,346 | 11/1967 | Laureti | 264—103 |
| 3,382,305 | 5/1968 | Breen | 264—171 |

DONALD J. ARNOLD, Primary Examiner

J. H. WOO, Assistant Examiner

U.S. Cl. X.R.

264—210, 138, 171, 164, 147, 321, 288; 28—72; 57—140